United States Patent
Cronin et al.

(10) Patent No.: US 7,263,090 B2
(45) Date of Patent: Aug. 28, 2007

(54) SYSTEM AND METHOD OF TIMING AND FREQUENCY CONTROL IN TDM/TDMA NETWORKS

(75) Inventors: Christopher J. Cronin, Monrovia, MD (US); Ramakrishnan Balasubramanian, Gaithersburg, MD (US)

(73) Assignee: Viasat, Inc., Carlsbad, CA (US)

( * ) Notice: Subject to any disclaimer, the term of this patent is extended or adjusted under 35 U.S.C. 154(b) by 1139 days.

(21) Appl. No.: 10/200,450

(22) Filed: Jul. 23, 2002

(65) Prior Publication Data

US 2003/0147426 A1     Aug. 7, 2003

Related U.S. Application Data

(60) Provisional application No. 60/352,870, filed on Feb. 1, 2002.

(51) Int. Cl.
*H04J 3/06*   (2006.01)
(52) U.S. Cl. ..................... 370/350; 370/509
(58) Field of Classification Search ............... 370/324, 370/350, 509
See application file for complete search history.

(56) References Cited

U.S. PATENT DOCUMENTS

| | | | | |
|---|---|---|---|---|
| 4,215,239 A | * | 7/1980 | Gordy et al. | ............... 375/365 |
| 6,501,743 B1 | * | 12/2002 | Kim et al. | .................. 370/324 |
| 2006/0126576 A1 | * | 6/2006 | Dale et al. | .................. 370/336 |

OTHER PUBLICATIONS

Digital Video Broadcasting (DVB); Interaction channel for Satellite Distribution Systems; DVB-RCS001rev14, Apr. 3, 2000, pp. 1-99.
E. I. Jury, Theory and Application of the z-Transform Method, Robert E. Krieger Publishing Co., Huntington, New York, 1973. pp. 296-299.
J. J. Spilker, *Digital Communications by Satellite*, Prentice-Hall, Inc., Englewood Cliffs, New Jersey, 336-341.
Andrew J. Viterbi, Principles of Coherent Communication, Prentice-Hall, Inc., Englewood Cliffs, New Jersey, 1966, pp. 36-37.

* cited by examiner

*Primary Examiner*—Melvin Marcelo
(74) *Attorney, Agent, or Firm*—Sughrue Mion, PLLC; Joseph Bach (57) ABSTRACT

A method and system of synchronizing two nodes of a network uses a demodulated output signal of a time division multiplex (TDM) demodulator to perform frequency and timing synchronization independently. Frequency synchronization is performed without using a program clock reference, by detecting a symbol timing loop error of the TDM demodulator. The error is filtered by an oscillator control loop filter if the error is within a predetermined range. Thus, an output voltage of a digital to analog converter that receives the filtered output controls an oscillator. In the timing synchronizer, an error between a program clock reference (PCR) and a value of a counter in the terminal is computed if the PCR is a not a first PCR, and the error is filtered with a timing loop control filter. A processor then adjusts a value of the counter in the terminal based on the filtered output.

24 Claims, 6 Drawing Sheets

SYSTEM AND METHOD OF TIMING AND FREQUENCY CONTROL IN TDM/TDMA NETWORKS

This application claims benefit to Provisional Application No. 60/352,870 filed Feb. 1, 2002; the disclosure of which is incorporated herein by reference.

BACKGROUND OF THE INVENTION

1. Field of the Invention

The present invention relates to a method of synchronizing two nodes of a communications network in time and frequency. More specifically, frequency and time are synchronized independently to improve stability and reduce cost in a satellite communication system.

2. Background of the Related Art

In the related art, satellite networks with "star" connectivity are used in various applications. For example, a hub of the star network transmits an outbound continuous time signal. The outbound signal is usually Time Division Multiplexed (TDM), and contains packets for a particular terminal or alternatively, multicast data. Correspondingly, the return link from the terminals to the hub uses Time Division Multiple Access (TDMA). In the related art, standardization of the TDMA return link has been attempted with the outbound signal using the Digital Video Broadcast (DVB) format, as discussed in Digital Video Broadcasting (DVB); Interaction channel for Satellite Distribution Systems; DVB-RCS001rev14, Apr. 3, 2000 (hereafter referred to as "Reference 1").

The related art scheme for synchronizing the terminals to the hub in time and frequency suggested in Reference 1 uses a timestamp generated at the hub known as a Program Clock Reference (PCR), alternatively referred to as a Network Clock Reference (NCR). The PCR timestamps are transmitted by the hub periodically (e.g., once every 100 milliseconds) in the TDM stream, and are received by all the terminals. The terminals use the PCR to adjust their local oscillators. Thus, the terminals are synchronized in frequency and time with the hub.

In the aforementioned related art system, the PCR is set to the value of a counter driven by a stable source (e.g., GPS based) at the hub. The counter at the hub is sampled just before the PCR transmission on the TDM stream. Additionally, another counter (referred to as the Local Master Counter (LMC)) is maintained at each of the terminals, and is driven by a temperature controlled crystal oscillator (TCXO). This TCXO is also the reference for the Out Door Unit (ODU). Using the same TCXO for both the counter and the ODU reduces terminal design cost.

Figure 1:
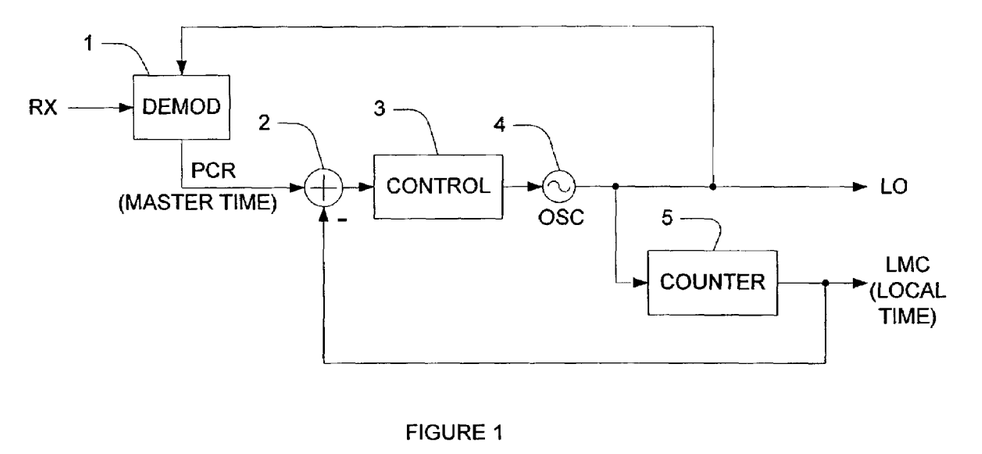
FIG. 1 illustrates a block diagram of frequency and timing control using PCR timestamps according to the related art.

FIG. 1 illustrates a block diagram of the related art time and frequency adjustment system. The basic related art method of synchronization is to lock the LMC to the received PCR value from a demodulator 1, using a Phase Locked Loop (PLL) implementation. This related art implementation locks the TCXO to the source at the hub in frequency, and locks the LMC to the PCR. Thus, the terminal is locked in time and frequency to the hub. The received PCR value experiences a random jitter due to the delay in the decoder/demodulator, on the order of plus or minus 2 bytes.

In operation an input signal Rx is received at the demodulator 1, which generates three outputs based on the input signal Rx. The first demodulator output (not illustrated) is the demodulated data, which is the primary output of the modulator, but is not of further interest to the present invention. The second demodulator output is the PCR timestamp shown in FIG. 1. The third demodulator output is a data symbol timing indicator, often implemented as a timing error signal, as discussed below.

In each of the terminals, a control filter 3 receives the PCR timestamp as adjusted by an adder 2 based on the value at the LMC. An output of the control filter 3 is then fed to an oscillator 4, the output of which is fed back into the demodulator 1 and to a counter 5. The output of the counter is the LMC value, and as noted above, is fed back to the adder 2.

This related art scheme has various problems and disadvantages. For example, but not by way of limitation, the stability of the TCXO 4 is affected by at least two phenomena. First, the stability of the TCXO 4 depends on its own phase noise spectrum, as discussed in J. J. Spilker, *Digital Communications by Satellite*, Prentice-Hall, Inc., Englewood Cliffs, N.J.

Second, the jitter in the received PCR values affects TCXO stability, since adjustments are made to the TCXO 4 periodically based on the PCR values. The phase noise mask of the TCXO 4 in the terminal should be such that the free-running TCXO has a stable output frequency for a time period of at least the time constant of the PLL. Otherwise, the TCXO 4 will change its frequency during the time that it is being adjusted by the loop, and frequency synchronization with the hub will not be accurate.

A total stability of around $10^{-8}$, which translates to a frequency error of 140 Hz at Ku band, is acceptable, because this frequency offset can be accommodated by the receiver at the hub. The performance of the loop in the presence of decoder delay has been analyzed, as discussed in greater detail below. To achieve the aforementioned frequency stability, with a decoder/demodulator jitter of plus or minus 2 bytes, and an outbound TDM transmission rate of 5 Msym/sec, the normal frequency of the second order loop should be around 0.001 Hz, assuming a damping of 0.7. The loop settling time for a normal frequency of 0.001 Hz is on the order of 1000 seconds. As a result, the TCXO used at the terminal must have a phase noise mask such that its output frequency, when free-running, is stable for about 1000 seconds. To meet this requirement, an expensive TCXO is required. Thus, there is a cost disadvantage to the TCXO of the related art system.

More specifically, the PCR stream is generated by a stable (i.e., GPS receiver-controlled) 27 MHz clock at the hub, and it is transmitted once every 100 milliseconds on the TDM stream. It is assumed that the TCXO at the terminal is also 27 MHz. Because the system is discrete and linear, work is performed in terms of the z-transform of all the variables. H(z) is the z-transform of the digital filter. The digital filter is such that the entire configuration is equivalent to a second order digital PLL. H(z) can be mathematically represented as:

$$H(z) = \tilde{G}_1 + \frac{\tilde{G}_2}{1 - z^{-1}}. \qquad (1)$$

The constants $\tilde{G}_1$ and $\tilde{G}_2$ depend on the sampling frequency, the TCXO gain, the normal frequency and the damping required. The method for deriving $\tilde{G}_1$ and $\tilde{G}_2$ can be found in Reference 1.

It is also necessary to determine the stability of the frequency of the TCXO, represented by:

$$\frac{\text{standard deviation}(f_k)}{\text{PCR clock frequency}}. \quad (2)$$

The combined gain of the D/A converter and the counter, denoted by $K_v$, can be calculated as:

$$K_v = \frac{\Delta f}{2^b} T, \quad (3)$$

where b is the number of bits in the D/A, and $\Delta f$ is the dynamic range of the TCXO.

The theoretical performance analysis of the related art scheme is discussed below. The expressions for the steady state variance of the TCXO and the time required for the transient error to die to a prescribed level are given. It can be shown using standard linear analysis that:

$$F(z) = Q(z)(P(z) + J(z)), \quad (4)$$

$$Q(z) = \frac{K_v}{T} \frac{(z-1)H(z)}{z-1+K_v H(z)}.$$

The main concern in this case is the effect of PCR jitter (i.e., the second component $J(z)Q(z)$ in equation (4)), on the adjusted TCXO. The variance of the PCR jitter is denoted by $\sigma^2$. The jitter in the adjusted TCXO frequency can be calculated mathematically if the PCR jitter is assumed to be Gaussian, as shown below:

$$\sigma_f^2 = \frac{1}{2\pi j} \sigma^2 \oint_{|z|=1} Q(z)Q(z^{-1})dz, \quad (5)$$

The integral in the above equation has been tabulated for various kinds of rational polynomials. Expanding Q(z) and using the tabulated integrals results in the following:

$$\sigma_f^2 = \frac{\sigma^2}{T^2} 2 \frac{G_2(2G_1^3 + 3G_1^2 G_2 + G_2^2 + G_1 G_2^2)}{G_1 G_2(4 - 2G_1 - G_2)}, \quad (6)$$

where $G_1$ and $G_2$ are $K_v \tilde{G}_1$ and $K_v \tilde{G}_2$ respectively.

Figure 2:
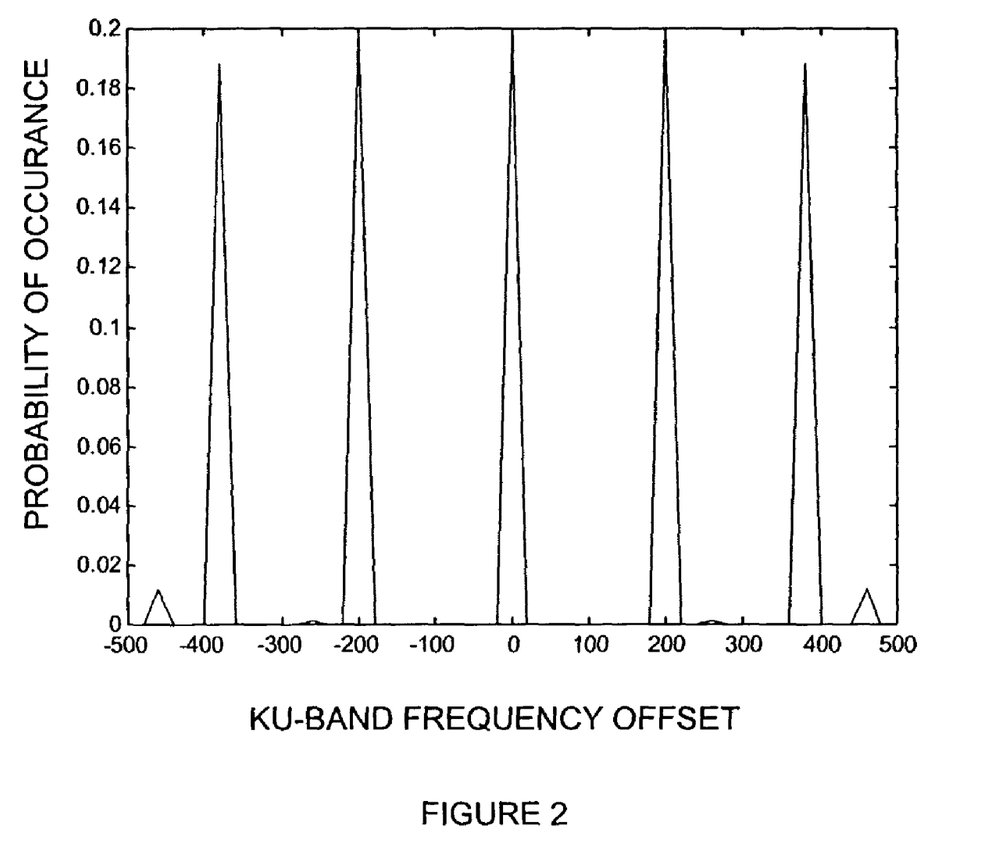
FIG. 2 illustrates a probability of Ku-band frequency offset for the present invention.

The transient error at the output of the TCXO is similarly derived using linear analysis. The time necessary for the transient error to be less than x Hz is approximated as follows:

$$t = \frac{-1}{\zeta 2\pi f_n} \log\left(\frac{x}{f_e} \sqrt{1-\zeta^2}\right) \text{seconds} \quad (7)$$

where $f_e$ is the initial error at the TCXO. For a TCXO with 1 ppm accuracy, $f_e$ will be at most ±27 Hz. An error of xHz at the 27 MHz clock translated to an error of (14000/27) *xHz at Ku-band. The simulation results of the foregoing theoretical discussion are discussed below. Table 1 shows the expected TCXO clock stability with Gaussian jitter and the comparison with simulations. For purposes of comparison, the variance of the Gaussian jitter was set equal to the uniform jitter. The outbound rate was set to the worst case value of 5 Msym/sec. The D/A resolution was 12 bits and the dynamic range of the TCXO was ±256 Hz. As shown in Table 1, the simulations matched the theoretical predictions. Although the average stability for the uniform and Gaussian jitters are substantially the same, Gaussian jitter can produce much higher errors than uniform jitter. The steady state distribution of frequency error at Ku-band, with uniform jitter, is shown in FIG. 2, which is the offset between the channels and also represents the operating environment of the present invention.

TABLE 1

Steady state TCXO stability, 2 bytes jitter, $f_n$ = 0.001 Hz, damping ratio = 0.707

| Delay (±bytes) | PCR jitter standard deviation (in 27 MHz symbols) | Theoretical stability (Gaussian jitter) | Stability with equivalent (Gaussian jitter) | Stability actual jitter |
|---|---|---|---|---|
| 1 | 35.1 | 1.16 × 10⁻⁸ | 1.16 × 10⁻⁸ | 1.16 × 10⁻⁸ |
| 2 | 60.8 | 2.00 × 10⁻⁸ | 2.00 × 10⁻⁸ | 2.00 × 10⁻⁸ |

Thus, in the related art, PCR loop bandwidths of about 0.001 Hz are required to achieve low Ku-band frequency errors (less than 500 Hz). However, such a low bandwidth requires about 25 minutes for the transient error at Ku-band to decrease to about 30 Hz.

Another related art solution uses higher loop-bandwidths at startup and switch to lower loop-bandwidths later. However, this related art hub must to tolerate a larger frequency error during startup.

SUMMARY OF THE PRESENT INVENTION

It is an object of the present invention to produce a TDM/TDMA system having a settling time on the order of a few seconds, such that the phase noise specifications for the TCXO can be relaxed, and a much less expensive TCXO can be used.

It is another object of the invention for the frequency control loop to use the recovered symbol timing, and the timing control loop to use the PCR timestamps in the TDM signal.

To achieve these and other objects, a method of synchronizing a hub and a terminal of a network is provided, including (a) initializing a time division multiplex (TDM) demodulator in accordance with a received TDM signal, (b) demodulating the TDM signal, and (c) if the TDM demodulator is locked, performing frequency synchronization and timing synchronization independently of each other based on the demodulated TDM signal.

Additionally, a system for synchronizing a first node and a second node of a network is provided, including a time division multiplex (TDM) demodulator configured to be initialized based on a received TDM signal that is subsequently initialized and demodulated, and a frequency synchronizer that operates independently of the timing synchronizer, based on the demodulated TDM signal and if the TDM demodulator is locked.

BRIEF DESCRIPTION OF THE FIGURES

The accompanying drawings, which are included to provide a further understanding of preferred embodiments of the present invention and are incorporated in and constitute a part of this specification, illustrate embodiments of the invention and together with the description serve to explain the principles of the drawings.

DETAILED DESCRIPTION OF THE PRESENT INVENTION

Reference will now be made in detail to the preferred embodiment of the present invention, examples of which are illustrated in the accompanying drawings. In the present invention, the terms are meant to have the definition provided in the specification, and are otherwise not limited by the specification.

The present invention includes a system and method for synchronizing two nodes of a network in time and frequency. An exemplary description of the present invention includes a hub as the first node and a terminal as the second node. However, the exemplary description is non-limiting, and other embodiments may also be included in the present invention. For example, but not by way of limitation, a peer to peer configuration, with at least two equal peers that communicate with one another, may be included in the present invention. Further, the present invention is also not limited to satellite, and other implementations may be provided as would be understood by one skilled in the art.

In the present invention, the frequency control loop uses the recovered symbol clock timing of the TDM demodulator, instead of the timestamp (i.e., PCR in the related art) values. Additionally, the local time (i.e., LMC in the related art) is still locked to the timestamp in the received signal. A difference between the related art and the present invention is that the local time of the present invention is directly adjusted after suitable filtering of the error signal, instead of being adjusted via the oscillator (e.g., TCXO), as is done in the related art. Also contrary to the related art system illustrated in FIG. 1 and described above, the local time LO is locked to the Rx signal in frequency. As a result, the local time LO will track the frequency standard of the reference node, which generates the data modulation of the signal transmitted from the reference node to arrive at the local node as the Rx signal. Thus, the timing control loop is substantially independent of the frequency control loop.

Figure 4:
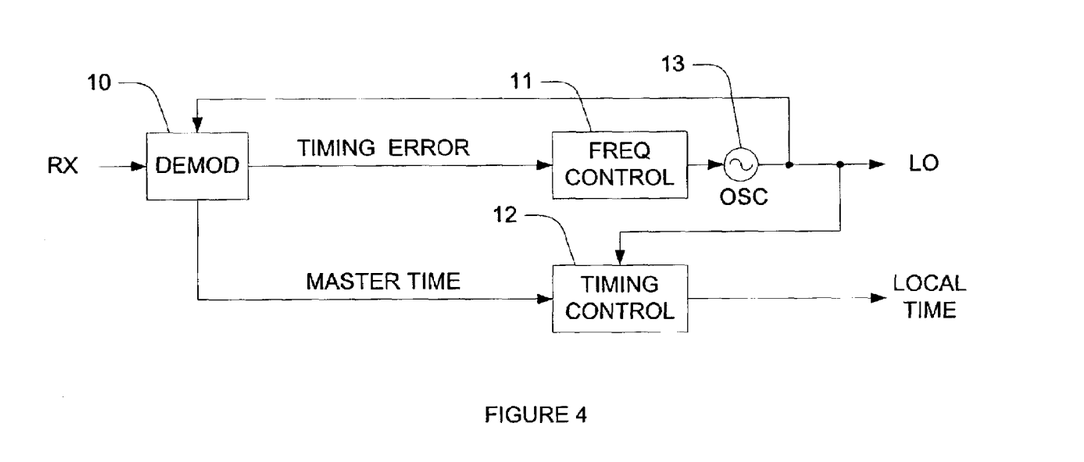
FIG. 4 illustrates a block diagram of a system according to the preferred embodiment of the present invention.

FIG. 4 is a block diagram of the above-described process according to the preferred embodiment of the present invention. An input signal Rx is provided at a TDM demodulator 10. A frequency control module 11 (i.e., location of the frequency control loop) receives symbol timing from the TDM demodulator, and operates independently of a timing control module 12 (i.e., location of the timing control loop) that receives master time (i.e., timestamp) from the TDM demodulator 10. The frequency controller 11 adjusts the oscillator 13, in accordance to its symbol timing input from the TDM demodulator 10. The oscillator output (LO) is used as a reference for the demodulator 10, the timing controller 12 and other parts of the terminal such as the Out Door Unit ODU and optionally, an In Door Unit IDU (not illustrated).

Figure 3:
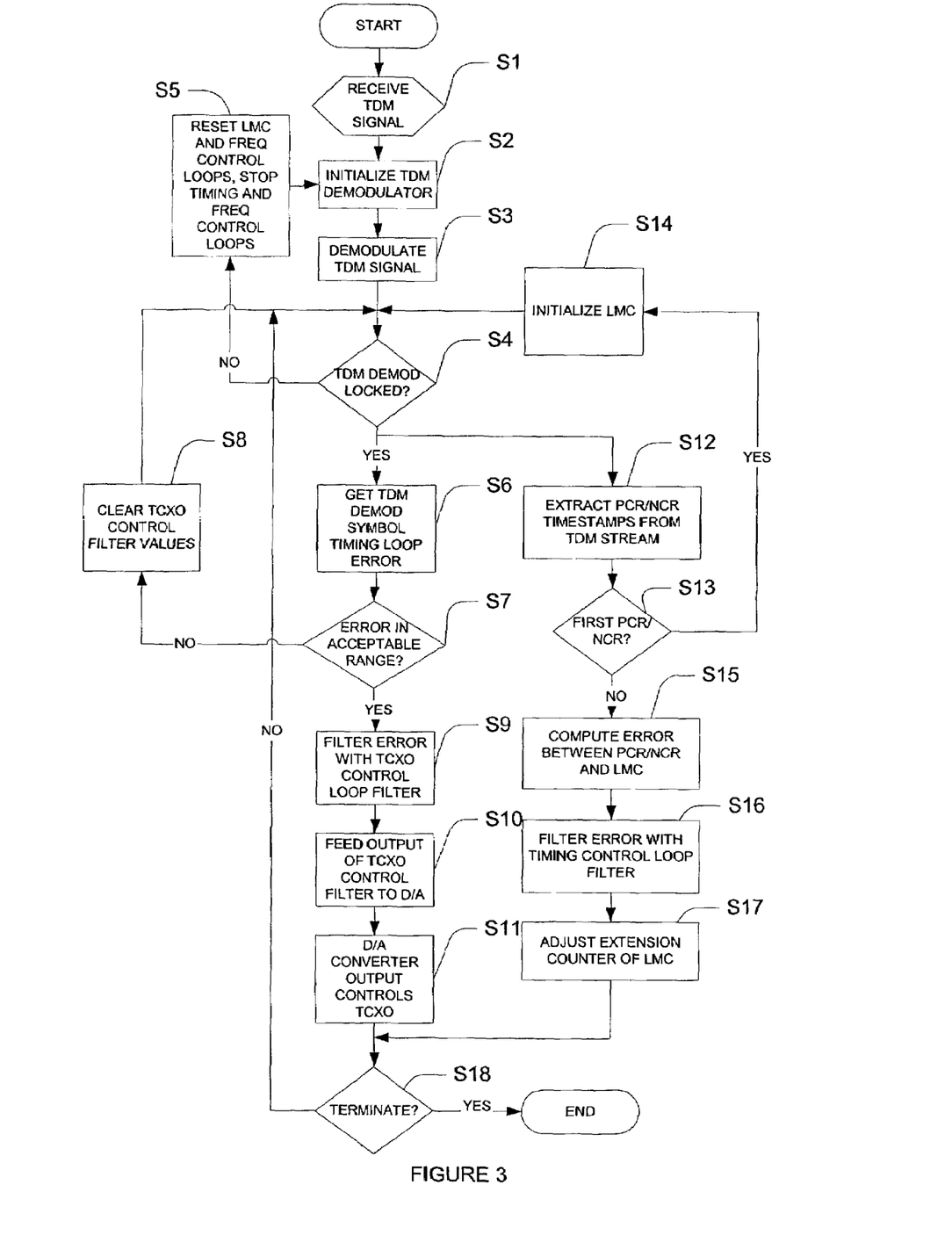
FIG. 3 illustrates a method according to the preferred embodiment of the present invention.

FIG. 3 illustrates the synchronization procedure according to the present invention. In a first step S1, a TDM signal (e.g., Rx) is received from the first node. Then, at a second step S2, a TDM demodulator at the second node is initialized, and the TDM signal Rx is demodulated at step S3. The method illustrated in FIG. 3 occurs at the second node (i.e., a terminal, which is the node that will be adjusting its time and frequency to match those of the first node). The first node (e.g., a hub of a network having at least one terminal) uses a procedure that can be the same as that of the related art first node, and thus is not further disclosed.

In a fourth step S4, it is determined whether the TDM demodulator has achieved lock. Lock is achieved based on the local signal LO providing a synchronizing signal to the TDM modulator. For example, but not by way of limitation, the TDM demodulator lock status may be monitored and determined by frame synchronization and/or a Viterbi decoder. If lock has not been acheived, at step S5, the LMC control loop 12 and the frequency control loop 11 are reset, and the timing and frequency control loops are terminated and the process is restarted. The Rx signal is a continuous TDM signal that is always received at the terminal. When the TDM modulator loses lock (e.g., due to rain fade), steps S2–S5 are repeated until TDM demodulator lock has been achieved.

Once it has been determined at step S4 that TDM lock has been achieved, then the frequency control loop 11 and the TDMA timing loop 12 are commenced. The timing loop and frequency control loop operations are performed substantially independently of one another, as detailed subsequently.

In the frequency control loop 11, at step S6, a TDM demodulator symbol timing loop error is generated. Then, in step S7, it is determined whether this error is in an acceptable range. If not, then the control filter values of the TCXO 13 are cleared at step S8, and step S4 is performed as discussed above.

Figure 5:
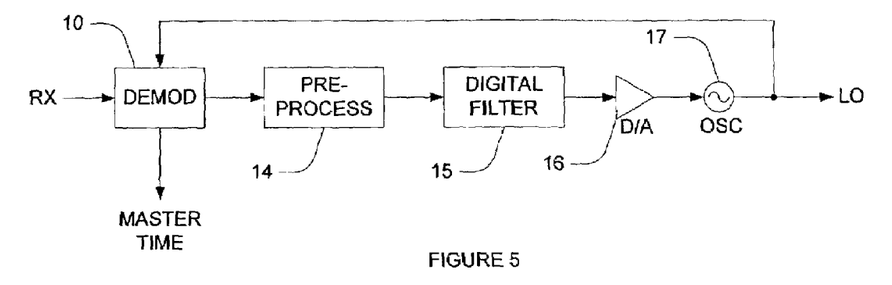
FIG. 5 illustrates a block diagram of a frequency adjustment component of an exemplary embodiment of the present invention.

If the aforementioned TDM demodulator symbol timing loop error is in the acceptable range, then at step S9, the error is filtered with a frequency loop filter 15, as illustrated in FIG. 5 and described in greater detail below. Next, the output of the filter 15 is fed to a D/A converter 16 (as illustrated in FIG. 5 and described in greater detail below) at step S10. At step S11, an output of the D/A converter 16 controls a TCXO 17 (as illustrated in FIG. 5 and described in greater detail below). Further, after step S11, step S4 is once again performed, and the process is performed iteratively as long as a TDM signal is received.

Once the TDM modulator 10 is locked, steps S6 and S12 occur. However, the TXCO 17 is adjusted at the frequency control loop 11 based on step S6. Based on values chosen for the filter of the TXCO 17, the TDM modulator 10 may lose lock. However, while the TDM modulator 10 is locked and the frequency of the TXCO 17 is adjusted in predetermined intervals, the frequency of the timing loops remains independent.

In the TDMA timing control loop 12, after it has been determined that the TDM demodulator 10 is locked at step S4, then at step S12, PCR/NCR time stamps are extracted from the TDM timestream. At step S13, it is determined whether the extracted PCR/NCR timestamps are the first PCR/NCR timestamps. If so, then at step S14, the LMC is initialized, and then step S4 is performed as described above.

Figure 6:
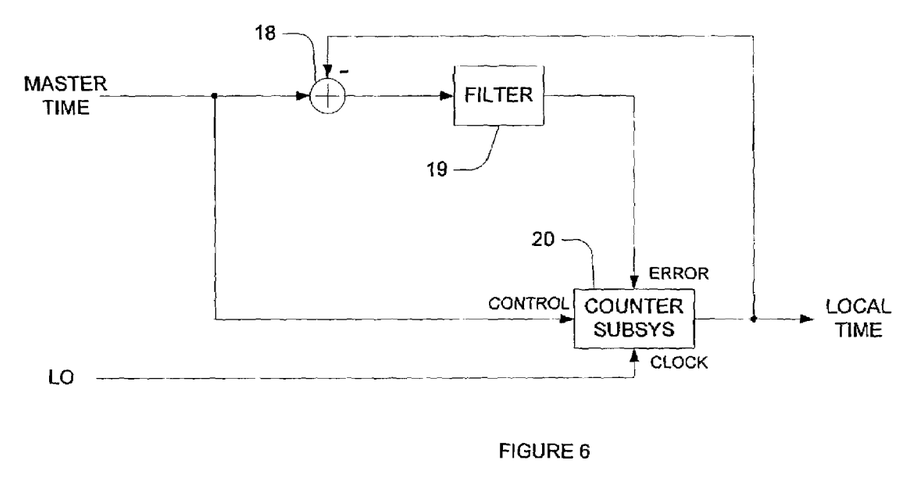
FIG. 6 illustrates a block diagram of a timing control component of the exemplary embodiment of the present invention.

If it is determined at step S13 that the extracted PCR/NCR is not the first PCR/NCR, then at step S15, an error between the PCR/NCR and the LMC is calculated, and at step S16, this error is filtered with a timing loop control filter 19, as illustrated in FIG. 6 and discussed in greater detail below. Next, at step S17, the extension counter 24 of the LMC is adjusted. Then, step S4 is performed, and as noted above, this process of the present invention is performed until it is determined that the process is to be completely terminated, as represented at step S18. However, step S18 only refers to exceptional circumstances (e.g., when communication between the nodes is terminated).

Both the frequency control loop and the timing control loop are activated only after the TDM demodulator 10 achieves lock and receives the TDM stream correctly. This is not a problem in the present invention, since TDM demodulators can achieve lock quickly over a wide range of frequency offsets. At this point, it can be determined whether the TDM demodulator 10 has achieved lock by various criteria (e.g., the decoder output).

Once the TDM demodulator 10 achieves lock, the error in the symbol-timing loop is read from the TDM demodulator 10. The symbol-timing loop error can be averaged to lower its variance. The number of samples averaged depends on the stability required. The averaged samples are fed to a digital filter with gains $G_1$ and $G_2$. The output is fed to a D/A converter, which controls the TCXO. Note that the TCXO also acts as the reference to the ODU. The TCXO usually has a nominal frequency of 10 MHz, since ODUs typically require a 10 MHz reference.

As noted above with respect to FIG. 3, frequency control and TDMA timing loop control are performed substantially independently. As illustrated in FIG. 5, in an example of the frequency control system, an output of the TDM demodulator 10 is received at a pre-processor 14. The pre-processor is configured to initialize and demodulate the TDM output. However, the present invention is not limited thereto, and the initialization and demodulation of the TDM output may alternatively occur in the TDM demodulator 10. Further, the pre-processor is also configured to detect a timing loop error.

Filtering of the TDM demodulator symbol timing loop error is then performed at a digital filter 15, typically implemented as a TCXO control loop filter. The output of the digital filter 15 is received at a D/A converter 16, and the D/A converter output is coupled to the TCXO 17. In the present invention, the TCXO 17 may be the TCXO 13. The output LO of the TCXO 17 is fed back to the TDM demodulator 10 and an outdoor Unit and then an indoor unit, as well as a phase-locked loop 22, as described herein.

In addition to the foregoing frequency control system, a TDMA timing control system performs timing control substantially independently of the frequency control system, as illustrated in FIG. 6. An output of the TDM demodulator 10 (i.e., master time) is received as the PCR at a first adder 18, and an error between the PCR and the LMC is calculated. The error calculating process is described in greater detail below. A difference between that error and the PCR is output from the first adder 18 and filtered at a filter 19.

Accordingly, a filtered output is generated, which controls an increment of the LMC, and is sent to a counter subsystem 20 to generate the local time. The counter subsystem 20 also receives the clock signal LO and a control signal from the TDM demodulator 10.

Figure 7:
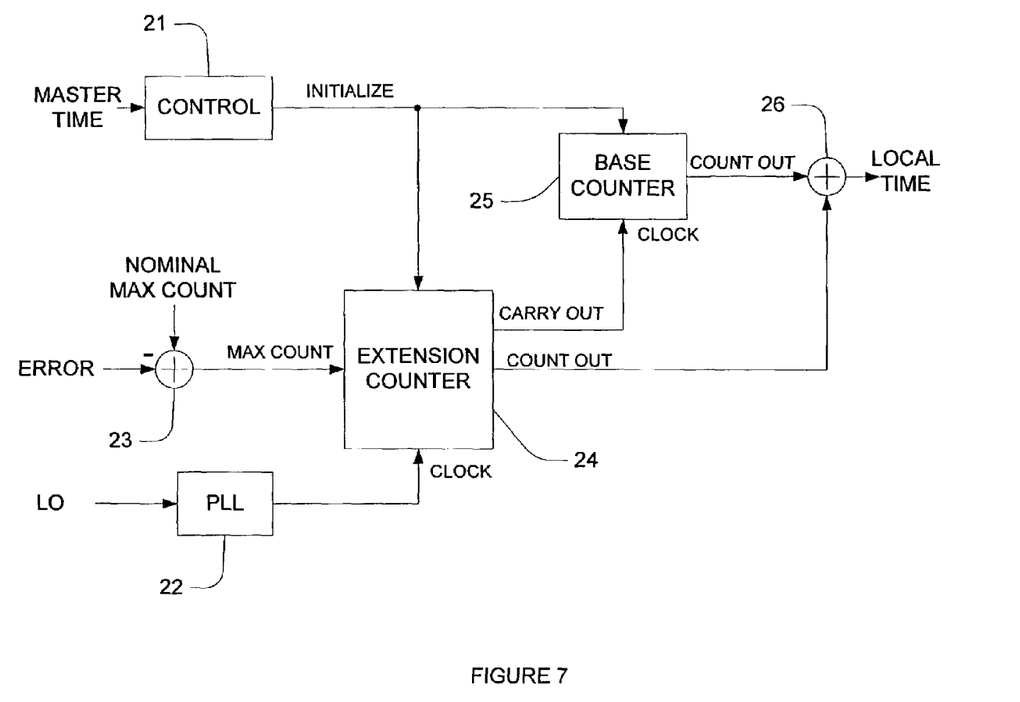
FIG. 7 illustrates a block diagram of a counter subsystem of the timing control component of the exemplary embodiment of the present invention.

FIG. 7 illustrates the counter subsystem according to the exemplary embodiment of the present invention. The filtered output (i.e., error) is sent to a second adder 23, and is subtracted from a predetermined nominal maximum counter value (e.g., 299), to generate an output y for an extension counter 24. For example, but not by way of limitation, if the value of the filtered adder is 0, then the value of y will be (299−0), or 299. The extension counter 24 counts from 0 to y and then resets. The extension counter 24 also receives a clock signal from PLL 22, and this extension is sent to a sixth adder 26. The extension counter 24 is initialized based on a master time value received from a controller 21 that receives the master time value from the TDM demodulator 10.

When the extension counter 24 resets, a signal is sent to a base counter 25, and the base counter 25 increments in accordance with the reset of the extension counter 24. Accordingly, the 33-bit base is set at this point. A third adder 26 then adds the base and the extension, and this value is then received by the first adder 18 as illustrated in FIG. 6, which subtracts the output of the sixth adder from the PCR to compute the error. It is noted that the extension counter 24 and the base counter 25 are initialized by the PCR, which is received from the TDM demodulator 10.

Because the base is 33 bits and the extension is 9 bits, the first adder 18 and the third adder 26 are 42-bit adders. However, the present invention is not limited thereto, and any combination of bits for the base and extension may be used.

The filtering is then performed as described above, and the extension counter of the LMC is adjusted as described above. Accordingly, timing control is performed using the foregoing implementation.

A 27 MHz clock is generated from the 10 MHz TCXO by PLL 22 to drive the LMC. After initialization, the extension counter of the LMC is directly changed each time a new PCR value is received, which synchronizes the LMC to the transmitted PCR in the TDM stream. The easiest way to implement the correction is to count from 0–299−x, where x is the output of the timing loop filter. The timing loop filter shown in FIG. 6 is a second order loop. However, filters of any other order can also be utilized if necessary.

An analysis of the foregoing preferred embodiment of the present invention was conducted, as described in greater detail below. Since the time constant of the timing filter is much higher (i.e., around 100 seconds) than the timing constant of the frequency control loop (i.e., a few seconds), the two loops can be analyzed separately.

As to the frequency control loop, typically, the loop bandwidths of the frequency synthesizers are substantially higher than the bandwidths of the symbol-timing filter in the TDM demodulator or the TCXO control loop filter. For convenience during the present analysis, the phase detector and NCO gains are assumed to be unity. However, those values are not limited thereto. Further, since these are simple multiplicative factors, the foregoing assumption does not lead to any loss of generality. It is also assumed that the timing NCO frequency and the A/D sampling frequencies are substantially the same (i.e, $H_1(s)$ and $H_2(s)$ are unity), which results in an easier analysis and provides additional insight into the behavior of the frequency control loop. This assumption may be relaxed. The closed loop transfer function under these assumptions is given by the following equation:

$$H(s) = \frac{2(sK_1 + K_2)(sG_1 + G_2)}{s^3 + s(sK_1 + K_2) + 2(sK_1 + K_2)(sG_1 + G_2)}. \quad (8)$$

The stability of the system is determined by the poles of the system (i.e., the roots of the polynomial in the denominator of the above equation). The symbol-timing loop filter is as follows:

$$K_1 = 2\zeta\omega_n,$$

$$K_2 = \omega_n^2. \quad (9)$$

The feedback filter constants are represented as follows:

$$G_1 = \alpha K_1,$$

$$G_2 = \alpha^2 K_2. \quad (10)$$

As a result, the bandwidth of the feedback filter is $\alpha$ times the bandwidth of the symbol-timing loop filter, and the damping coefficients of both filters are the same. As a result, the denominator polynomial becomes:

$$p(s) = s^3 + 2\zeta\omega_n(1 + 4\zeta\omega_n\alpha)s^2 + \omega_n^2(1 + 4\zeta\omega_n\alpha(1+\alpha))s + 2\alpha^2\omega_n^4. \quad (11)$$

The stability of the above system can now be analyzed. A typical value for the timing loop filter is $\zeta=1$ and $\omega_n=2\pi\times500$ radians/sec. With those values, a simple MATLAB program was written to determine the roots of p(s). It was determined that none of the roots were positive. For $\alpha=0.01$, the pole closest to the right half of the s-plane was −15.58, and for higher values of $\alpha$, the poles were even further away from the right-half plane. The system was stable for all values of $\alpha$ from 0.01 to 1.0, which means that the system is stable for a quite a large range of values of $\alpha$.

However, the value of $\alpha$ has to be reasonably small if the effect of the synthesizers is considered (i.e., situations where $H_1(s)$ and $H_2(s)$ are not unity). The effect of the synthesizers is negligible if $\alpha$ is made reasonably small. For example, but not by way of limitation, $\alpha=0.001$ was suitable when the normal frequencies of the timing loop and the synthesizer loop are the same. For $\alpha=0.001$, the pole closest to the right-half plane was −1.99, which means that the slowest transient dies approximately as exp(−1.99t), and the loop settling time is of the order of about 2 seconds.

The stability of the present invention is high because the symbol-timing loop error samples have a low variance. For example, but not by way of limitation, at Eb/No=4 dB, the standard deviation of the timing-loop samples is about 0.05. Thus, the stability for a 10 MHz clock is better than 0.05/10 Mhz=$5\times10^{-9}$ due to the filtering of these samples, and the loop gives good performance in terms of stability and loop-settling time.

As to the timing control, the timing loop is a modification of the conventional PLL. Therefore, the results for PLLs, which are available for the conventional PLL, are not repeated here. However, when the TDMA timing control loop was simulated for different normal frequencies, the performance matched the theoretical results for second order PLLs.

In the present invention, certain variations and modifications are possible. For example, the term "clock" signal is not limited to the frequency source (i.e., LO), but can also include a real-time clocking signal. Further, while it is disclosed that the clock signal LO is received at the outdoor unit, the destination of the clock signal is not limited thereto. For example, but not by way of limitation, the clock signal may also be received in an indoor unit from the outdoor unit. Additionally, it is assumed that there will be a data output from the TDM demodulator.

Additionally, while the exemplary embodiment of the present invention may be applied to digital video broadcast (DVB) applications, the present invention is not limited thereto, and may have other broadcast or non-broadcast applications as would be understood by one of ordinary skill in the art. Also, it is understood that the present invention is not limited to the PCR or master time, as other time stamps may be applied, and that the present invention is also not limited to the TCXO, as other oscillators may be applied. Further, the present invention is not limited to the LMC, and generally includes any relevant local time.

The present invention has various advantages. For example, but not by way of limitation, the settling time of the frequency control loop is of the order of a few seconds (e.g., two seconds). Thus, relatively inexpensive TCXOs can be used. Further, the stability of the frequency control loop is also very high, at least due to the filtering of the symbol-timing loop samples.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. A method of synchronizing a first node which transmits a TDM signal and a second node of a communications network, where the second node tracks the first node, comprising:
   (a) initializing a time division multiplex (TDM) demodulator at said second node which is a network terminal, in accordance with a received TDM signal received from said first node;
   (b) demodulating said TDM signal in said TDM demodulator; and
   (c) if said TDM demodulator has achieved lock, performing a frequency synchronization process and a timing synchronization process, said frequency synchronization process operates independently of said timing synchronization process based on said received TDM signal.

2. The method of claim 1, further comprising:
(d) resetting a counter and resetting a frequency control loop in said second node;
(e) terminating said frequency synchronization and said timing synchronization; and
(f) performing step (a) through step (c), wherein step (d) and step (e) are performed if said TDM demodulator is not locked at step (c).

3. The method of claim 1, said frequency synchronization process comprising:
(c-1) determining a symbol timing loop error of said TDM demodulator,
(c-2) if said error is within a predetermined range, filtering said error with an oscillator control loop filter;
(c-3) feeding an output of said filter to a digital to analog (D/A) converter; and
(c-4) performing step (c), wherein an output voltage of said D/A convener controls an oscillator.

4. The method of claim 1, said timing synchronization process comprising:
(c-1) extracting a program clock reference (PCR) from said demodulated TDM signal;
(c-2) if said PCR is a not first PCR, computing an error between said PCR and a value of a counter in said second node;
(c-3) filtering said error with a timing loop control filter to generate a filtered output;
(c-4) adjusting a value of said counter in said second node in accordance with said filtered output; and
(c-5) performing step (c).

5. The method of claim 4, wherein the step of computing an error comprises:
(c-2-a) initializing a base counter and an extension counter;
(c-2-b) subtracting said filtered output from a predetermined value to generate a processed output for said extension counter;
(c-2-c) performing a first counting operation at said extension counter in accordance with said processed output and an input from a phase locked loop (PLL) to generate an extension output; and
(c-2-d) performing a second counting operation at said base counter in accordance with a reset signal of said extension counter to generate a base output; and
(c-2-e) adding said extension output and said base output to generate said error.

6. The method of claim 5, wherein said base output is 33 bits and said extension output is 9 bits.

7. The method of claim 1, wherein said frequency synchronization process is performed within two seconds.

8. The method of claim 1, wherein said frequency synchronization is performed without use of a program clock reference (PCR).

9. The method of claim 1, wherein determination of whether said TDM demodulator is locked is performed by one of a frequency frame synchronizer and a Viterbi decoder.

10. The method of claim 1, wherein said first node comprises a hub of said network and said second node comprises at least one terminal of said network.

11. The method of claim 1, wherein said first node and said second node are equal peers in a peer-to-peer network.

12. The method of claim 1, wherein said synchronizing is performed for at least a digital video broadcasting (DVB) application.

13. A system for synchronizing a first node and a second node of a network, comprising:
(a) a time division multiplex (TDM) demodulator configured to be initialized based on a received TDM signal that is subsequently initialized and demodulated;
(b) a frequency synchronizer; and
(c) a timing synchronizer, wherein the frequency synchronizer operates independently of the timing synchronizer, based on said received TDM signal and a determination whether or not said TDM demodulator is locked.

14. The system of claim 13, wherein operations of said frequency synchronizer and said timing synchronizer are reset if said TDM demodulator is not locked.

15. The system of claim 13, said frequency synchronizer comprising:
(c) a preprocessor that detects a timing loop error;
(d) an oscillator control loop filter that filters said error if said error is within a predetermined range; and
(e) a digital to analog (D/A) converter that receives an output of said oscillator control loop filter, wherein an output voltage of said D/A converter controls an oscillator.

16. The system of claim 13, said timing synchronizer comprising:
(a) a device that extracts a program clock reference (PCR) from said demodulated TDM signal;
(b) a circuit that computes an error between said PCR and a value of a counter in said second node if said PCR is a not a first PCR; and
(c) a filter that filters said error with a timing control loop filter to generate a filtered output, wherein a value of said counter in said second node is adjusted in accordance with said filtered output.

17. The system of claim 16, wherein said circuit comprises:
a base counter and an extension counter that are initialized by said PCR, wherein,
said extension counter receives an input generated by subtracting said filtered output from a predetermined value and performs a first counting operation in accordance with said input and a signal received from a phase locked loop (PLL), to generate an extension output, and
said base counter receives a reset signal of said extension counter and performs a second counting operation to generate a base output; and
an adder that adds said extension output and said base output to generate said error.

18. The system of claim 17, wherein said base output is 33 bits and said extension output is 9 bits.

19. The system of claim 13, wherein said frequency synchronizer performs a synchronization within two seconds.

20. The system of claim 13, wherein said frequency synchronizer performs a synchronization without use of a program clock reference (PCR).

21. The system of claim 13, further comprising one of a frame synchronizer and a Viterbi decoder that determines whether said TDM demodulator is locked.

22. The system of claim 13, wherein said first node comprises a hub of said network and said second node comprises at least one terminal of said network.

23. The system of claim 13, wherein said first node and said second node are equal peers in a peer-to-peer network.

24. The system of claim 13, wherein said system is synchronized for at least a digital video broadcasting (DVB) application.

* * * * *